United States Patent [19]
DeLuca et al.

[11] Patent Number: 5,095,498
[45] Date of Patent: Mar. 10, 1992

[54] BIT SYNCHRONIZER

[75] Inventors: Michael J. DeLuca; Joan S. DeLuca, both of Boca Raton, Fla.

[73] Assignee: Motorola, Inc., Schaumburg, Ill.

[21] Appl. No.: 306,124

[22] Filed: Feb. 6, 1989

[51] Int. Cl.$^5$ .......................... H03D 1/00; H04L 7/04
[52] U.S. Cl. ..................................... 375/94; 375/111; 328/109
[58] Field of Search ................... 375/76, 94, 95, 110, 375/111, 114, 119; 370/105.1; 328/109; 340/825.44, 825.52, 825.65, 311.1; 455/38

[56] References Cited

U.S. PATENT DOCUMENTS

| | | | |
|---|---|---|---|
| 4,029,905 | 6/1977 | Abraham | 375/110 |
| 4,146,743 | 3/1979 | Raynham | 375/110 |
| 4,414,676 | 11/1983 | Kraul et al. | 375/119 |
| 4,456,884 | 6/1984 | Yarborough | 375/110 |
| 4,506,262 | 3/1985 | Vance et al. | 375/114 |
| 4,518,961 | 5/1985 | Davis et al. | 340/825.44 |
| 4,554,665 | 11/1985 | Beesley | 375/81 |
| 4,653,073 | 3/1987 | Vercellotti et al. | 375/94 |
| 4,837,854 | 6/1989 | Ayagi et al. | 340/825.44 |
| 4,928,086 | 5/1990 | Drapac et al. | 340/825.44 |

Primary Examiner—Benedict V. Safourek
Assistant Examiner—Young Tse
Attorney, Agent, or Firm—Daniel R. Collopy; Philip P. Macnak; Vincent B. Ingrassia

[57] ABSTRACT

A digital synchronizer examines a signal transmitted at a predetermined baud rate for a predetermined time. Upon completion of the predetermined time, a decision is made as to whether or not the signal included the predetermined baud rate. If the signal includes the predetermined baud rate, a bit clock is established indicative of the boundaries and center of each baud symbol. The synchronizer samples the signal at a multiple of the baud rate and accumulates the phase relationship between the samples and transitions of the signal during the predetermined time. Upon conclusion of the predetermined time, the distribution of the phase relationships is examined and the presence or absence of signal is determined. If the presence is determined, the bit clock is established.

23 Claims, 9 Drawing Sheets

BIT SYNCHRONIZER

BACKGROUND OF THE INVENTION

1. Field of the Invention

This invention relates generally to the area of synchronizing to data transmissions received by a data receiver. Particularly this invention relates to a signal detector and bit synchronizer for use in a portable paging receiver.

2. Description of the Prior Art

Bit synchronization to a digital transmission is a process used to determine the presence of symbol boundaries of a data transmission having symbols and thereafter to provide a clock to synchronously sample the symbols. When the signal modulation is a binary frequency shift keying (FSK) signal, each symbol corresponds to one bit. Other modulations may have other correspondence. Bit synchronization may be a process used in a paging receiver receiving and decoding a digital signalling protocol proposed by British Telecom in England which is commonly termed POCSAG (Post Office Code Standardization Advisory Group) which is a binary FSK modulation signal.

Synchronization to such a signal is known and has been described in detail in U.S. Pat. No. 4,518,961, issued May 21, 1985, to Davis et al. which shows synchronization to either the POCSAG or a Golay signalling protocols. Additionally, U.S. Pat. No. 4,506,262, issued Mar. 19, 1985 to Vance et al. shows synchronization to POCSAG using an early/late phase locked loop with coarse and fine synchronization modes.

Line 10 of FIG. 1 shows a typical POCSAG signal. Prior to the signal, noise or another type of protocol may be transmitted as shown in area 12 enclosed in a broken line. The POCSAG signal begins with a preamble signal, 14, which consists of a number of one-zero transitions. The preamble is followed by a plurality of thirty two bit information words, each coded in a 31, 21 extended BCH code (32,21,1). The information words begin with a sync code word 16a which contains a predetermined binary sequence. At every seventeenth word thereafter another sync code, 16b, occurs in the signal. Between the sync codes the information is structured as eight information frames each of which contains two (32, 21) words. For illustration, the contents of frame four, as indicated by the number 18 in FIG. 1, is shown on line 34. Line 34 has two thirty-two bit words, 36 and 38, each information word having 32 data bits structured in the (32, 21) format. It can be appreciated that if the POCSAG protocol is ignored, the data bits shown on line 34 can appear to be effectively a random sequence of data transmitted at a predetermined baud rate.

The sync code provides a means for frame synchronization to the signal. Thus it is desirable to first bit synchronize to the preamble signal and subsequently frame synchronize to the sync code. Line 20 shows the operation of a pager synchronizing to the POCSAG signal. During interval 22 and 24, the pager is attempting to synchronize to the signal. However, the signal is not present. During interval 26, the preamble signal, 14, is present, the pager bit synchronizes and finds sync code 16a. Then in a known manner, the pager decodes information in preassigned frame 4 as shown by intervals 28 and 32. The pager also tests for sync code 16b during interval 30.

In some instances, the preamble signal may be corrupted by noise rendering the preamble signal undetectable. In this situation, it is desirable to acquire bit synchronization on the data bits within the thirty-two bit words, and subsequently frame synchronize to one of the periodic sync code signals. The bit synchronization process in this mode is more difficult because the data in the thirty-two bit words is effectively random. Consequently, it is desirable to provide a selective call receiver capable of acquiring bit synchronization on either a POCSAG preamble signal or data signals within POCSAG information words.

Battery life is a critical aspect of portable selective call receivers and it is desirable to conserve battery power whenever possible. In the absence of the POCSAG signal, selective call receivers operate in a low power mode and periodically activate receiving and decoding circuitry in order to detect the presence of the POCSAG signal. If no signal is detected, the paging receiver again operates in a low power mode. This process conserves battery power.

Consequently, it is desirable to provide a means for detecting the absence of the POCSAG signal in a minimal time. In doing so, additional battery power may be conserved. Prior art pagers have typically analyzed a predetermined number of transitions and in response to various algorithms, determine the absence of the POCSAG signal. One such algorithm is shown in U.S. Pat. No. 4,554,665, issued Nov. 19, 1985 to Beesley. However, using a predetermined number of transitions requires waiting for the transitions to occur. Such techniques suffer greatly under conditions where transitions occur relatively infrequently, such as when low frequency tones are transmitted in place of the POCSAG signal. While waiting for all of the transitions to occur, the prior art receivers are consuming additional battery power. Thus it is desirable to search for the POSCAG signal for a predetermined and substantially short time interval, while maintaining the ability to bit synchronize to the POCSAG preamble signal and/or the random data transitions. Rapid bit synchronization is also desirable in order to begin the frame synchronization process at the earliest possible moment. It is therefore desirable to gather transition data during a short integration time in order to either determine the absence of the POCSAG signal or establish a bit clock synchronized to the POCSAG signal.

Furthermore, prior art paging receivers typically establish a predetermined relationship between the sensitivity of detecting the POCSAG signal in a noise environment and falsely detecting of a POCSAG signal when only noise or another signal is present. However because paging receivers are used in many different paging environments around the world, a sensitivity and falsing performance in one application may not be optimal for another application. Thus it is desirable to construct a bit synchronizer for a paging receiver which can readily adapt sensitivity and falsing characteristics.

Finally, in order to conserve power in a paging receiver having a microcomputer, it is desirable to provide a bit synchronizer capable of operating at a reduced microcomputer bus speed. Prior art paging receivers with microcomputers typically sample the incoming signal at a very high rate, and typically use a digital phase locked loop implemented in software in order to establish a bit clock for sampling data bits after synchronization. Software generated digital phase locked loops require high sampling rates and continuous phase adjustments in a real time software environment. This requires a microcomputer to operate at a relative high data rate.

U.S. Pat. No. 4,414,676, issued Nov. 8, 1983 to Kraul et. al. shows a synchronizer which, in the preferred embodiment, samples at five times the data rate and performs numerous calculations between each sample. Kraul et. al. does not show the capability to synchronize on random data. Thus it is desirable to construct a bit synchronizer which provides for a low sample rate. It is desirable to construct a bit synchronizer which in one operation establishes a bit clock synchronized to the data signal. These operations will provide for operating the microcomputer at a reduced bus rate thereby reducing the power consumption and extending the battery life of the paging receiver.

SUMMARY OF THE INVENTION

It is therefore an object of the present invention to provide a means for resolving the aforementioned issues.

It is an object of the present invention to provide a means for determining the presence or absence of, signal of a predetermined baud rate at the completion of a predetermined integration time.

It is another object of the present invention to provide a means for establishing a bit clock synchronized to the baud rate at the completion of the predetermined integration time if the baud rate is detected.

It is yet another object of the present invention to vary threshold values in order to modify the sensitivity and falsing characteristics of detecting a signal having a predetermined baud rate.

It is yet another object of the present invention to provide a means for adjusting the integration time in order to modify the battery power consumption versus the sensitivity and falsing characteristics of detecting a signal having a predetermined baud rate.

It is yet another object of the present invention to provide a bit synchronizer implemented within a microcomputer that allows the microcomputer to operate at a reduced bus rate thereby reducing the power consumption of the microcomputer.

In accordance with the present invention, a digital signal detector is provided which receives a signal having a plurality of digital symbols received at a predetermined baud rate. The signal detector comprises a phase generating means for generating a reference signal having a frequency integrally related to the baud rate, thereby providing a reference signal which is an integer multiple of the baud rate. The reference signal has a plurality of independent phase signals thereby providing a plurality of phase signals relative to the received signal. The digital signal detector further comprises a transition detecting means responsive to the signal for detecting transitions which may occur between symbols and for producing an edge signal in response thereof. The digital signal detector further comprises a counting means responsive to said transition detecting means and said phase generating means, said counting means having a plurality of phase accumulators wherein a phase accumulator counts in response to an edge signal occurring in coincidence with a corresponding phase signal. The digital signal detector further comprises a controlling means for initializing said counting means and for enabling said counting means for a fixed integration time and for generating a completion signal at the end of the fixed integration time. And the digital signal detector further comprises an analyzing means responsive to said counting means and said controlling means, wherein said analyzing means determines a total number of edge signals occurring during the integration interval, determines a threshold value in response to the total, and produces a detect signal in response to the threshold value being exceeded by the count within a phase accumulator.

DESCRIPTION OF A PREFERRED EMBODIMENT

Figure 1:
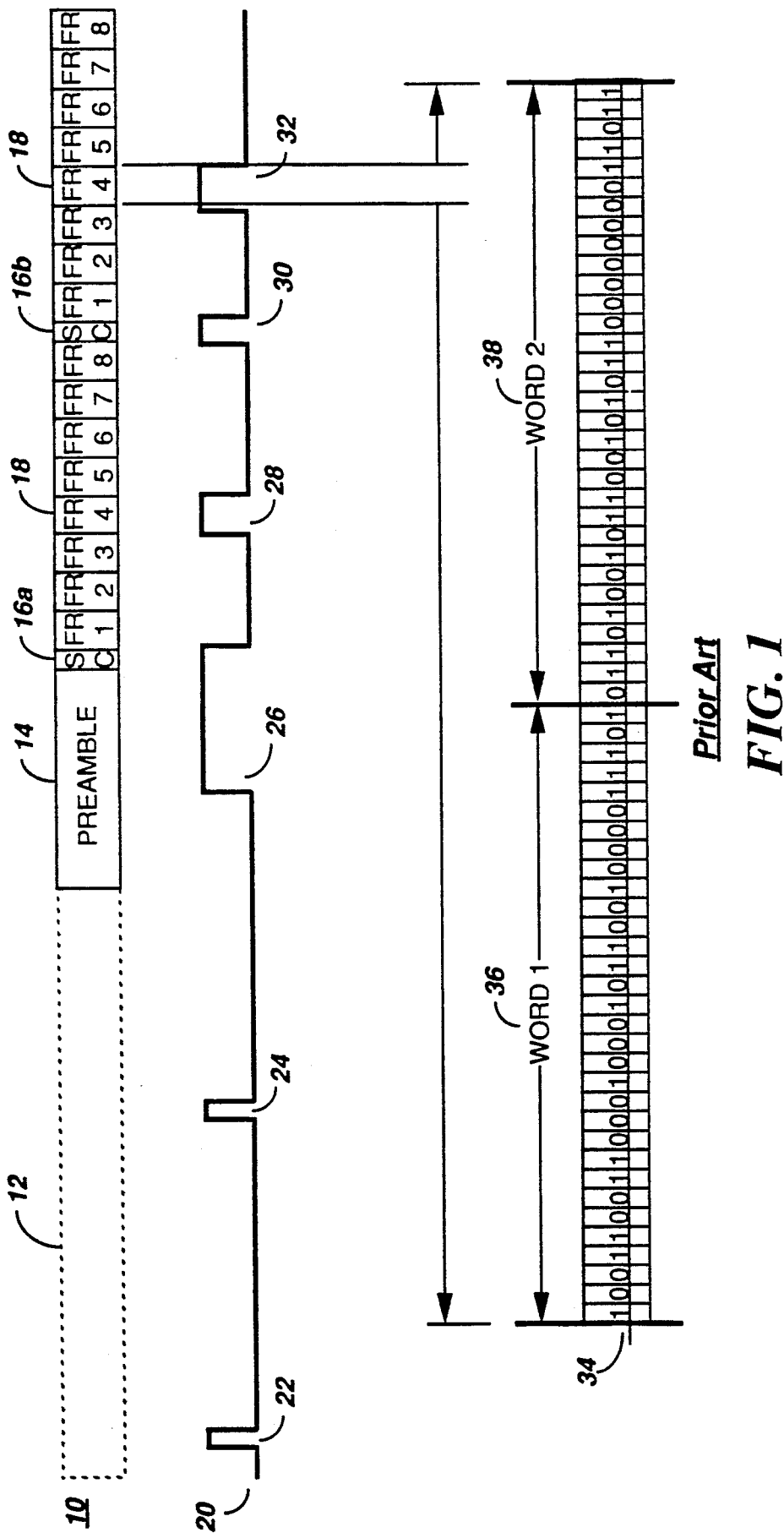
FIG. 1 shows a prior art implementation of the POCSAG signal and a paging receiver's operation in response thereof.
Figure 2:
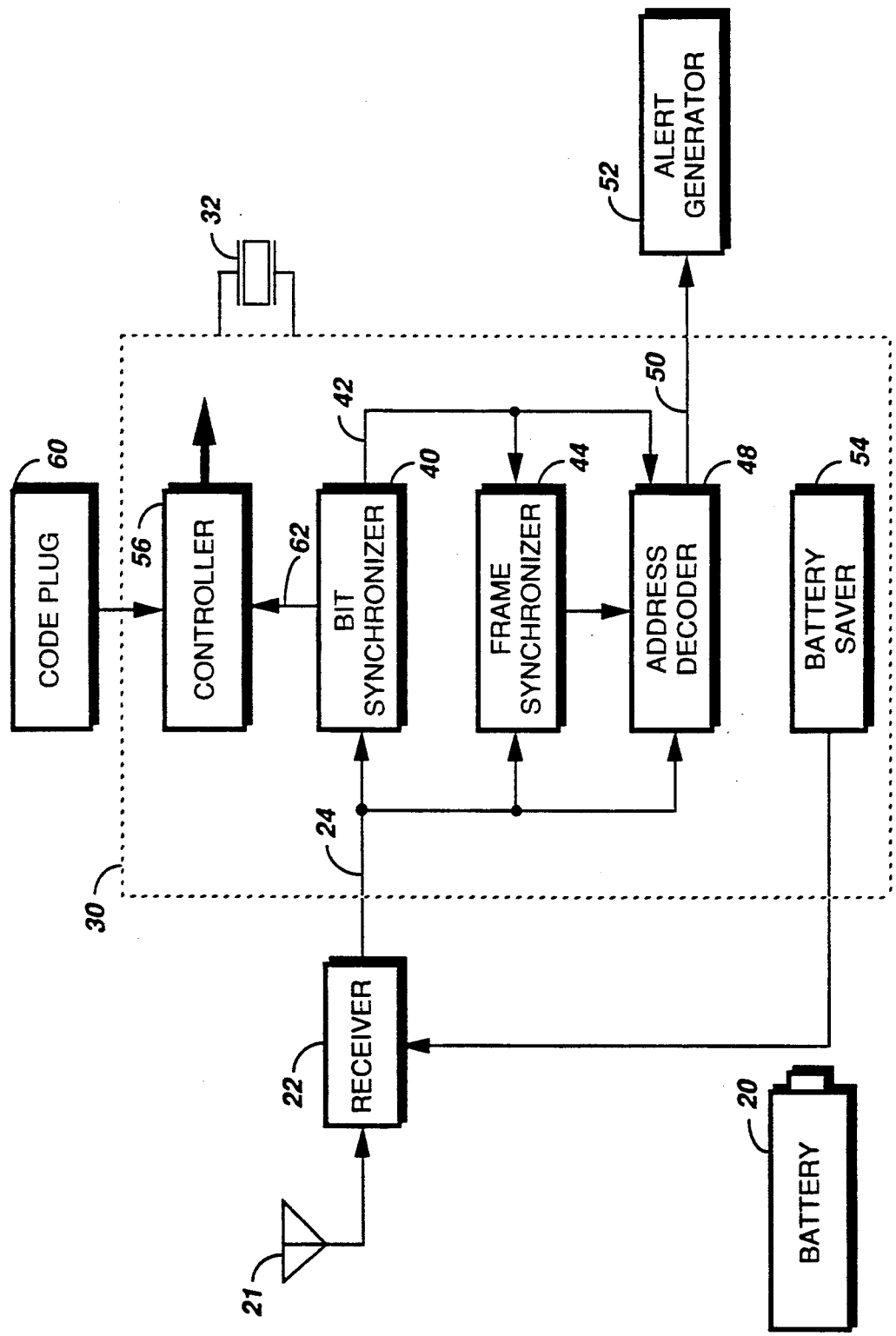
FIG. 2 shows a block diagram of a paging receiver in accordance with the present invention.

FIG. 2 shows a block diagram of a paging receiver which includes the present invention. The receiver is powered by battery 20 which is typically a AAA sized battery. The battery supplies operating power for the circuits within the paging receiver. Antenna 21 receives a POCSAG signal which is frequency modulated onto a radio signal. Receiver 22 receives the frequency modulated signal and through a process well known in the art demodulates and recovers the binary POCSAG signal which is output on line 24. In the absence of POCSAG signals, the received signal on line 24 has the equivalent of noise signals or other signals which may be received by the receiver 22.

The received signal is processed by a decoder means 30, which includes functions shown enclosed by a broken line. The decoder means 30 is driven by a crystal 32, which provides a time base for decoding operations. The received signal 24 is processed by bit synchronizer 40 which bit synchronizes to the POCSAG signal and produces a bit clock signal 42 in response thereof. Bit clock signal 42 is used by frame synchronizer 44, in order to detect the POCSAG sync code occurring within the received signal 24, and generate a framing signal 46 in response to detection of the sync code. Address decoder 48 uses the bit clock signal 42, and the framing signal 46 in order to detect a predetermined address occurring with the received signal 24. The address decoder generates an alert signal 50 in response to the detection of the address. The alert signal causes alert generator 52 to generate an alert which may be seen or heard by the user of the paging receiver. Battery saver 54 periodically renders the receiver 22 operational. Controller 56 supplies timing signals to the functions within the decoding means 30 in order to cause the proper operation and cooperation of the functions in order to decode the POCSAG signal and to conserve power consumption. Controller 56 also reads code plug 60 which includes information such as the predetermined address used by address decoder 48 and some operational characteristics used by bit synchronizer 40.

Bit synchronizer 40 also detects the absence of POCSAG signals and produces an absence signal 62 which is used by controller 56 to cause battery saver 54 to conserve power.

The functions of control means 30 may be implemented in hardware circuits. However, the preferred embodiment implements these function blocks in a program having software routines which operate within a host microcomputer. A host microcomputer such as the Motorola MC146805H2 microcomputer may readily implement these functions and is a preferred host microcomputer. Descriptions are well known in the art that enable one skilled in the art to, with a microcomputer within a receiver, control the receiver and decode transmitted signals. Such descriptions include U.S. Pat. No. 4,518,961, May 21, 1985, to Davis et al, U.S. Pat. No. 4,649,538, Mar. 10, 1987 to DeLuca et al, and U.S. Pat. No. 4,755,816, July 5, 1988, to DeLuca, which are hereby incorporated by reference.

A simplified description of the operational theory of the invention is presented. Basically, in the preferred embodiment the bit synchronizer samples the received data at four times the bit rate of the expected POCSAG signal, thereby dividing each bit into four separate phases. Because the data rate is predetermined, the four phases are frequency locked to the signal, however the phases relationship of the four phase to the bit boundaries of the signal is undetermined. When two bits in the signal have a different binary state, a transition occurs at the bit boundary. Data transitions detected in the signal are accumulated in one of four accumulators corresponding to each of the four phases. The transitions are accumulated for a predetermined amount of time. The predetermined amount of time is referred to as an integration time. At the end of the integration time the contents of the accumulators are analyzed. It can be appreciated that when a strong signal is present, all of the transitions will be accumulated in a single accumulator because the phases are frequency locked to the signal. Under this condition, it can be determined that a signal is present. It can be further determined that the center of the bit is 180° away from the phase where all of the edges were accumulated. Consequently, a bit sampling clock with such a phase relationship can be established at the end of the predetermined time.

Under noise conditions, transitions will occur at random intervals, this will result in transitions being approximately equally distributed among the four accumulators at the end of the integration time. This is a very different distribution from the strong signal distribution where all of the transitions occurred in a single accumulator. The analyzer in response to such a noise distribution will determine that the POCSAG signal is not present and generate an absence signal in response to the determination.

Under conditions where the signal is combined with noise, the distribution of accumulated edges will degrade from being distributed in a single accumulator to being distributed in several accumulators. However, in the presence of the POCSAG signal, a significant number of transitions will be accumulated in either one accumulator or two accumulators of adjacent phase. It is a function of the analyzer to locate such a distribution. When such a distribution is located, the bit clock can be established to be 180° away from the average of the occurrence of the transitions.

The task of the analyzer is compounded because it is not possible to know ahead of time how many transitions will occur within the predetermined time. This is because the synchronizer is capable of synchronizing on data in the POCSAG signal. If only the POCSAG preamble signal were used for bit synchronization, a number of simplifications can be made. This is because during the preamble signal, a transition occurs with every bit. Thus in the predetermined time, a predetermined number of transitions can be expected. However, in order to provide for more reliable operation, it is desirable to synchronize on either the preamble signal or the data signal. Since the number of transitions in the data signal are effectively random, the analyzer must provide for a number of different total results in the four accumulators while still detecting the presence or absence of the data signal when mixed with noise.

The analyzer relies on the fact that although the number of transitions may vary, the distribution of the transitions should remain the same. This is accomplished using a look up table which includes a number of threshold values to be used in the search for distributions. For each possible number of total transitions occurring within the integration time, there is a corresponding threshold value. The analyzer determines the total number of transitions and uses the corresponding threshold value to determine the distribution and thereafter the presence or absence of the signal.

The distributions used to determine the presence or absence of signal are critical in the sensitivity and falsing performance of the synchronizer. As the signal becomes more and more mixed with the noise, the distribution in the transitions within the accumulators becomes closer and closer to the random distribution. In order to detect signal deeper in the noise it becomes necessary to accept distributions which are much less centered among one or two of the accumulators, these distributions will be more sensitive to the signal. However because the distributions are closer to the noise distribution, there is an increased probability that a distribution of transitions accumulated during a short integration time and while in a noise environment will appear to be a valid signal. When noise is interpreted as a signal, it is referred to as a noise false, because signal was falsely detected when noise was actually present.

Falses are undesirable because in response to a signal detect, the pager maintains the operation of the receiver for a long interval thereafter in order to detect a POCSAG sync code. Since noise is present, no sync code will be found. Thus battery power is unnecessarily expended searching for sync code and the battery life of the pager degrades. However, since different pager applications require different sensitivity and falsing characteristics, the preferred embodiment provides four tables of threshold values, each table having a different set of threshold values. The table suitable for the pager application may be selected by the bits in the pager code plug.

Additionally, the length of the integration time affects the distribution of the accumulation. If the integration time is very long, a large number of transitions will have occurred by the end of the integration time. The distribution in the four accumulators in a noise environment, would be approximately equal. However, it is desirable to make the integration time as short as possible in order to conserve battery power in the absence of the signal. But, a shorter integration time results in fewer transitions accumulated and consequently a lower probability of receiving a distribution which can be interpreted as noise. This results is a higher probability of falsing, or a lower sensitivity or both. Consequently, a longer integration time is desirable in order to more accurately distinguish signal from noise, while a shorter integration time is desirable in order to conserve battery power.

The invention provides for modifying the integration time in order to set the battery power consumption versus the sensitivity and falsing characteristics. An algorithm takes into account the integration time and normalizes the values of the accumulated transitions. This allows one threshold table to be used for a number of integration times.

Finally, the invention provides a means for operating the microcomputer at a low bus rate. The invention samples the received signal at a relatively low rate of four times per bit, and only accumulates transitions in respective accumulators during the integration time. No calculations or phase adjustments are made during the integration time as in the prior art microcomputer based bit synchronizers. This relieves the demand for microcomputer bus cycles during the integration time. After the completion of the integration time, a simplified determination is made on the distribution of the accumulations in order to detect signal or noise. The calculation is simplified by use of the threshold table. As a result of the calculation, a bit clock in phase with the data can be established. The simplifications also reduce the demand for bus cycles, thus a means is provided which allows the microcomputer to operate at a lower bus rate during bit synchronization. This reduces power consumption and extends the battery life of the paging receiver.

Figure 3:
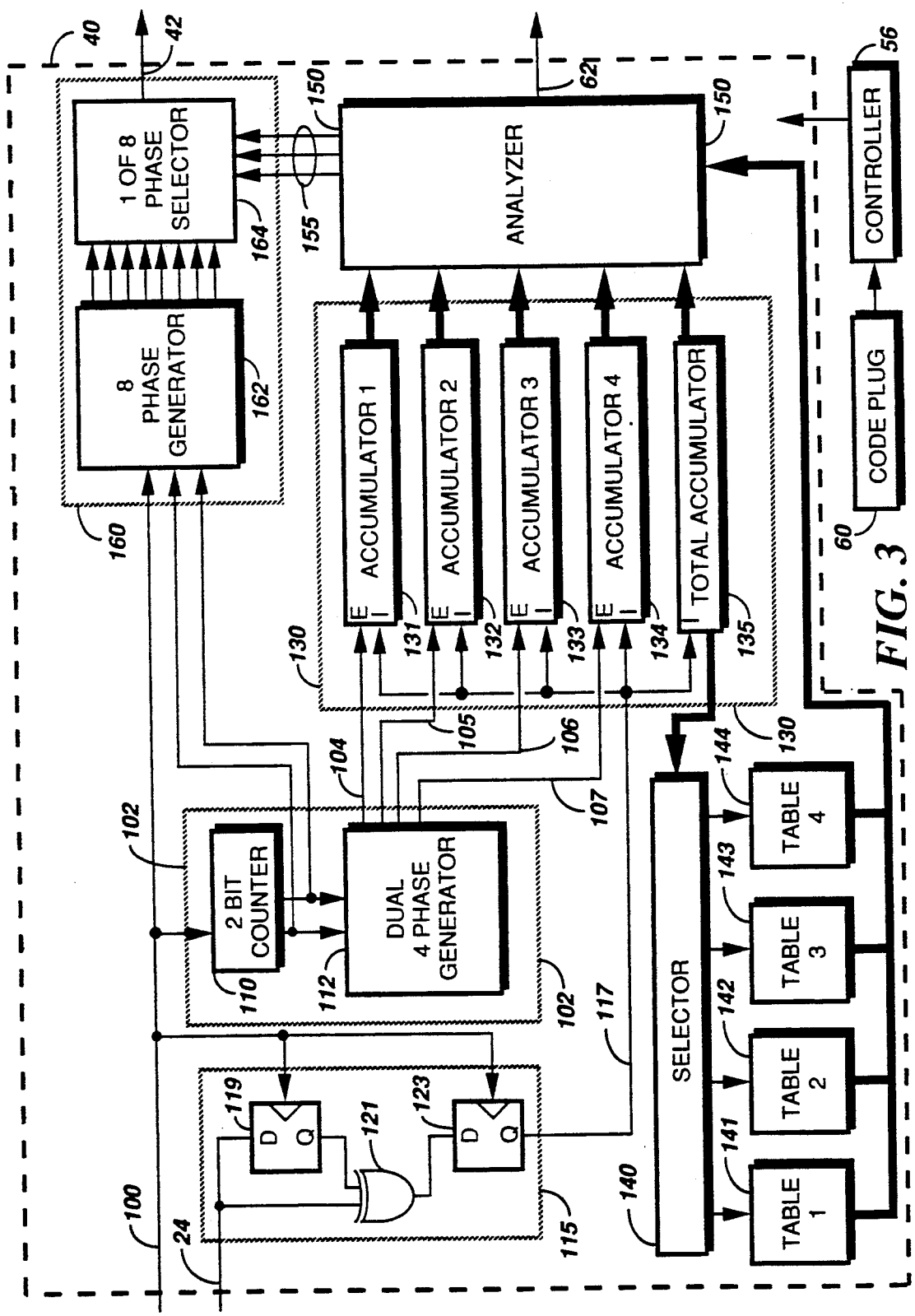
FIG. 3 shows a block diagram of a synchronizer operating in accordance with the present invention.

FIG. 3 shows a block diagram of bit synchronizer 40 which operates in accordance with the present invention. A clock signal 100 provides timing for the operation of the bit synchronizer and is derived from crystal 32. Clock signal 100 drives phase generating means 102 which produces four phase signals 104–107. Each phase is independent and represents one fourth of a bit. This may be accomplished using a two bit counter 110 to drive a four phase generator or multiplexer 112.

Clock signal 100 also drives transition detecting means 115 which produces a transition signal 117 in response to a zero to one transition or a one to zero transition on the received signal input 24. Flip flop 119 is a "D" flip flop which samples and latches the data. Exclusive OR gate 121 compares the received signal 24 with the delayed signal from flip flop 119. If a transition has occurred, exclusive OR gate 121 will produce a pulse in response to the transition. The pulse is latched by flip flop 123, the output of which produces the transition signal 117.

Counting means 130 operates during the integration time and has five accumulators 131–135. Accumulators 131–134 are selectively enabled by the four phase signals 104–107, respectively, each accumulator being enabled for one fourth of a bit time. If a transition signal occurs while an accumulator is enabled, the accumulator is incremented. Accumulator 135 is always enabled during the integration time and is incremented in response to each transition signal. The values within accumulators 131–134 represent transitions accumulated during each phase of a bit. The value within accumulator 135 represents the total number of transitions.

At the end of the integration time, selector 140 in response to bits in the code plug 60 selects one of four tables, 141–144. The selector uses the total transition value from the total accumulator 135 to determine a threshold value from the selected threshold table. Each threshold table has a different set of threshold values which correspond to the total transition accumulation. In the preferred embodiment, the normalized integration time is the equivalent of 16 bits times. The threshold tables provide threshold values from one through twenty transitions. The threshold tables are as follows:

| TOTAL TRANSITIONS | TABLE 1 THRESHOLDS | TABLE 2 THRESHOLDS | TABLE 3 THRESHOLDS | TABLE 4 THRESHOLDS |
| --- | --- | --- | --- | --- |
| 1 | 0 | 0 | 0 | 0 |
| 2 | 0 | 0 | 0 | 0 |
| 3 | 0 | 0 | 3 | 0 |
| 4 | 0 | 4 | 3 | 4 |
| 5 | 0 | 4 | 4 | 5 |
| 6 | 0 | 4 | 4 | 5 |
| 7 | 0 | 5 | 5 | 6 |
| 8 | 0 | 6 | 6 | 7 |
| 9 | 0 | 7 | 7 | 8 |
| 10 | 0 | 8 | 8 | 9 |
| 11 | 0 | 8 | 8 | 9 |
| 12 | 10 | 9 | 9 | 10 |
| 13 | 11 | 10 | 10 | 11 |
| 14 | 12 | 10 | 10 | 12 |
| 15 | 13 | 10 | 11 | 12 |
| 16 | 13 | 10 | 11 | 13 |
| 17 | 13 | 11 | 12 | 13 |
| 18 | 14 | 12 | 12 | 14 |
| 19 | 15 | 13 | 13 | 15 |
| 20 | 15 | 13 | 13 | 15 |

The different set of values in each threshold table causes the synchronizer to have varying sensitivity and falsing characteristics.

The resulting threshold value is then used by analyzing means 150 in order to determine the presence of signal based upon the values within the four accumulators 131–134. The analyzing means 150 searches for a value in any one of the accumulators 131–134 to be greater than or equal to the determined threshold value. If this condition is found, a phase for the bit clock is selected to be 180° away from the phase corresponding to the accumulator having a value greater than or equal to the determined threshold value. If this condition is not met, the analyzing means 150 sums the values of accumulators 1 and 2 and checks if the summed value is greater than or equal to the threshold value. If this condition is found, a phase for the bit clock is selected to be 180° away from the middle of the two phases corresponding to the accumulators 1 and 2. If this condition is not found the process is repeated for accumulators 2 and 3, then accumulators 3 and 4, and finally accumulators 4 and 1. If after all of the comparisons, the threshold value was not equaled or exceeded, the analyzing means 150 determines that the signal is not present and generates noise signal 62. If the signal is present, one of eight phase signals will be generated by the analyzer, as indicated by signal 155.

In response to the signal 155, bit clock generating means 160 generates a bit cock 42 on one of eight phases. The bit clock generating means has an eight phase generator 162 which is responsive to clock signal 100 and the two bit counter 102. The combination provides for the selection of 4 phases equivalent to the four phases which drive the counting means as well as four more phases in between. One of the outputs of phase generator 162 is selected by selector 164 in response to signal 155, thereby establishing the bit clock 42.

The functions within synchronizer 40 are controlled by controller 56 which sequences the functions and reads the code plug 60. The controller 56 also sets the integration time of the synchronizer in response to the code plug contents. In one embodiment, integration times are equivalent to 8, 16, 32 or 64 bit times of the POCSAG signal. The threshold values in tables 141-144 are normalized to a 16 bit integration time. The controller causes the analyzer to normalize the values in the accumulators 131-135 immediately after the integration time by dividing the values in the accumulators by 0.5, 1, 2, or 4 if the integration time is 8, 16, 32 or 64 bits respectively.

Figure 4:
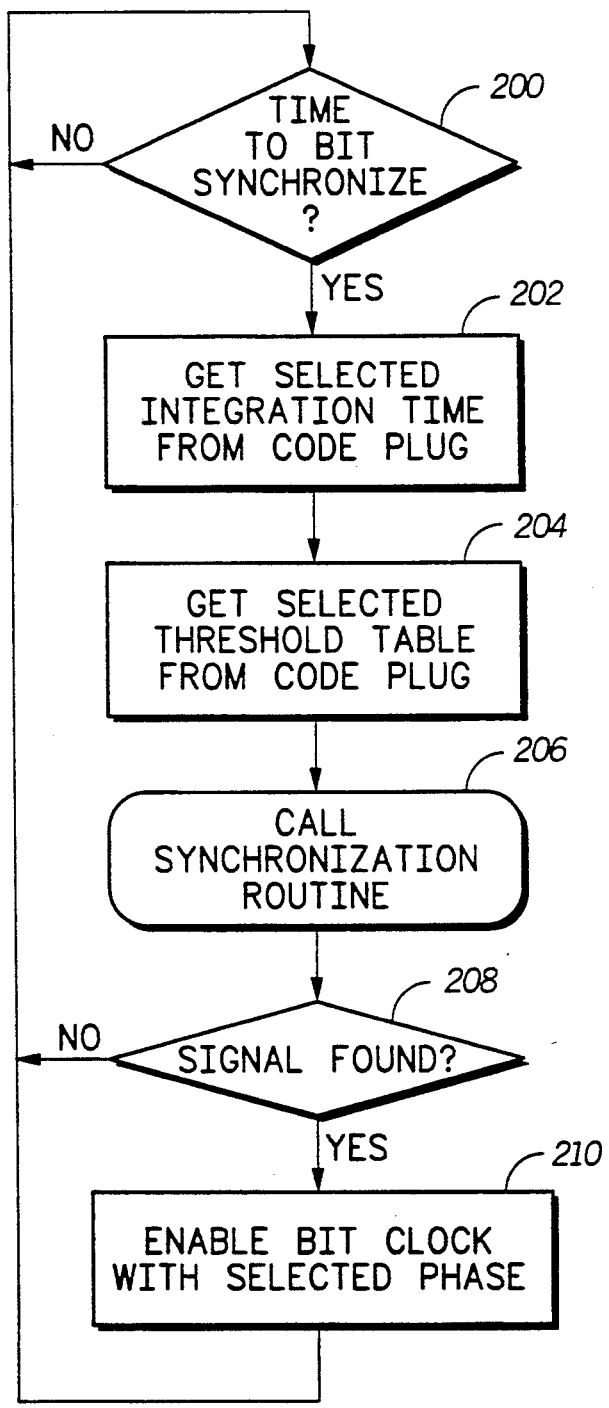
FIG. 4 shows a flow chart of a routine which initializes and calls the synchronization routine of FIG. 5.
Figure 5A:
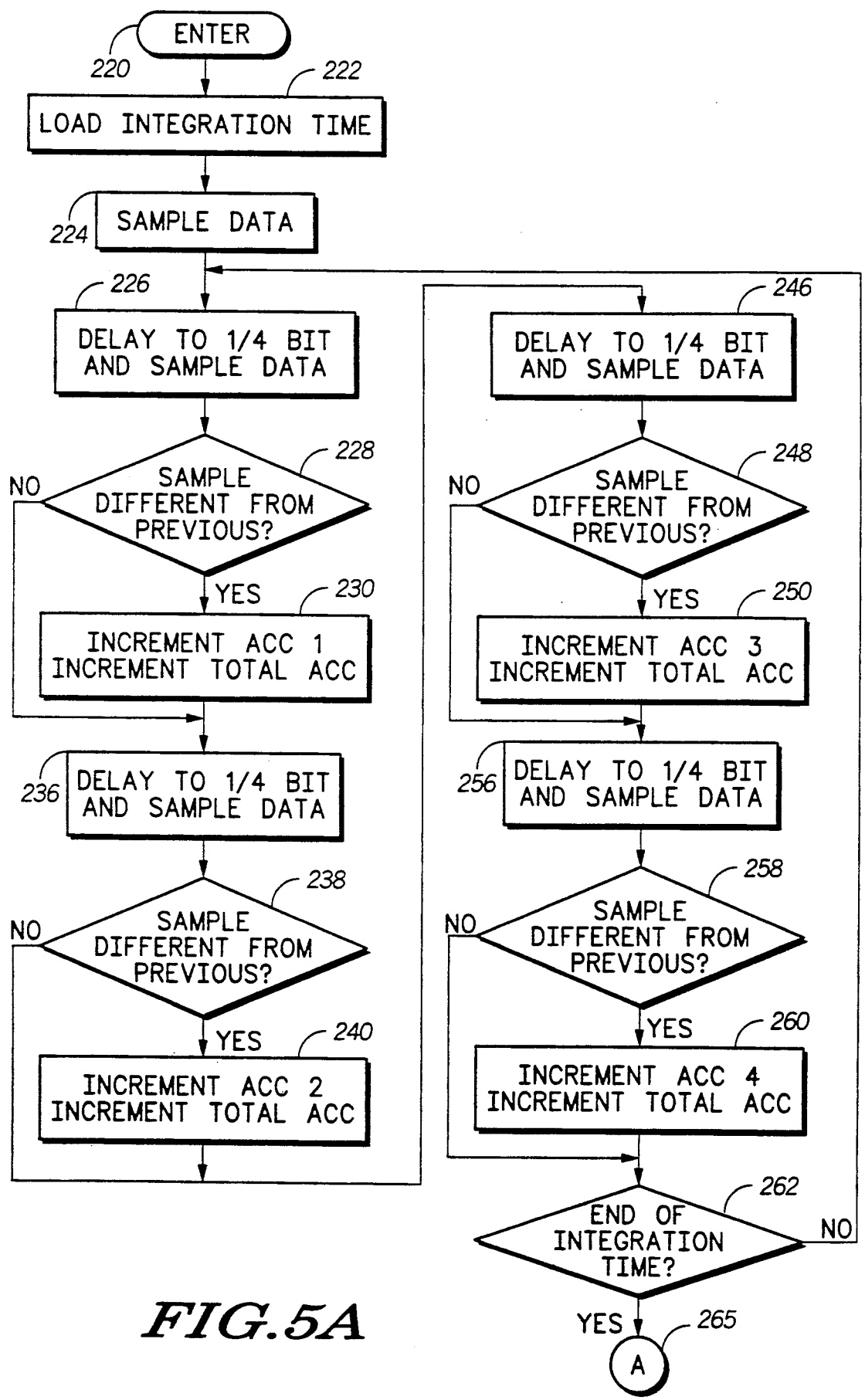
FIG. 5 A–D shows a flow chart of the synchronizer operating in accordance with the present invention.
Figure 5B:
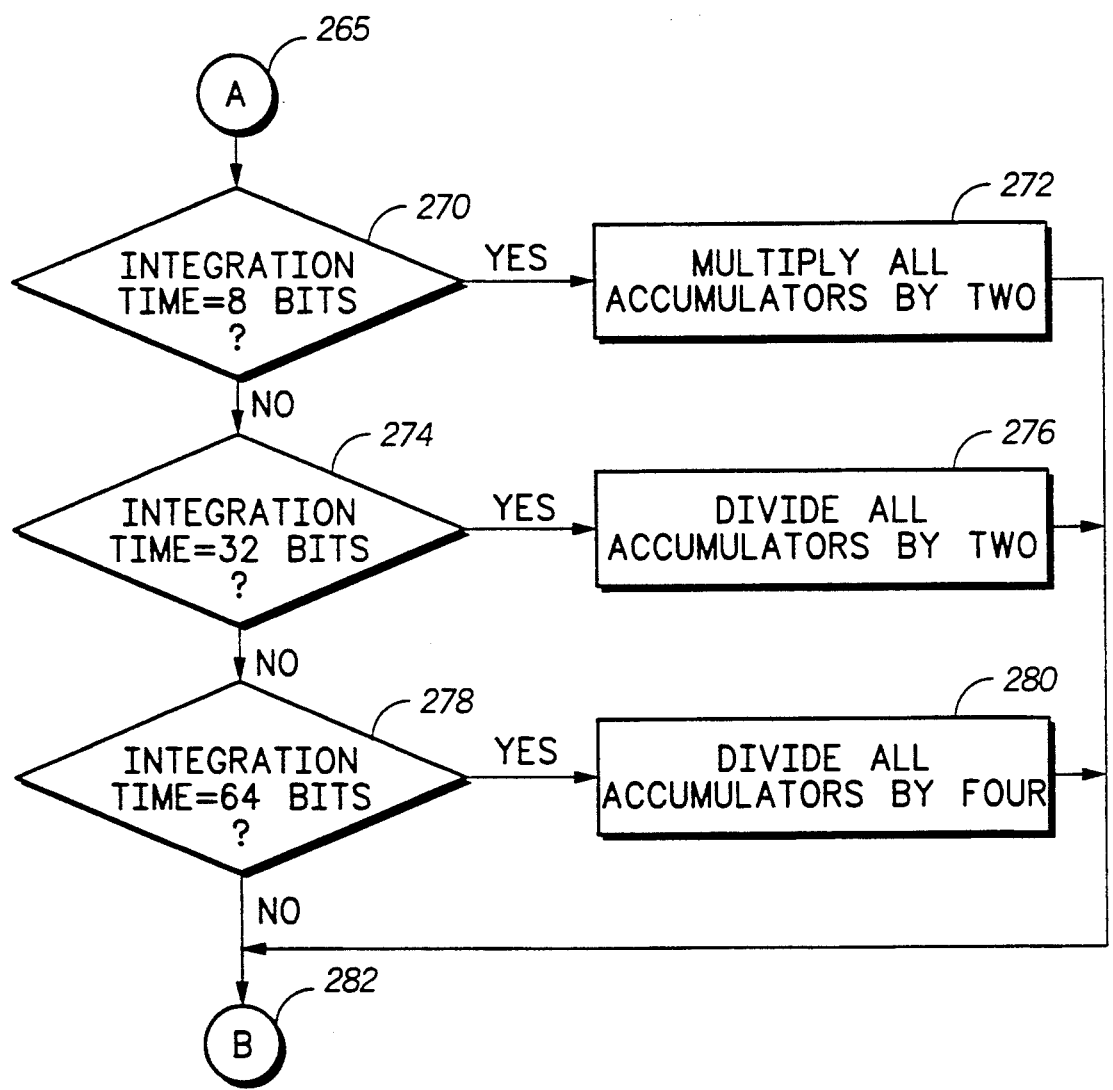
Figure 5C:
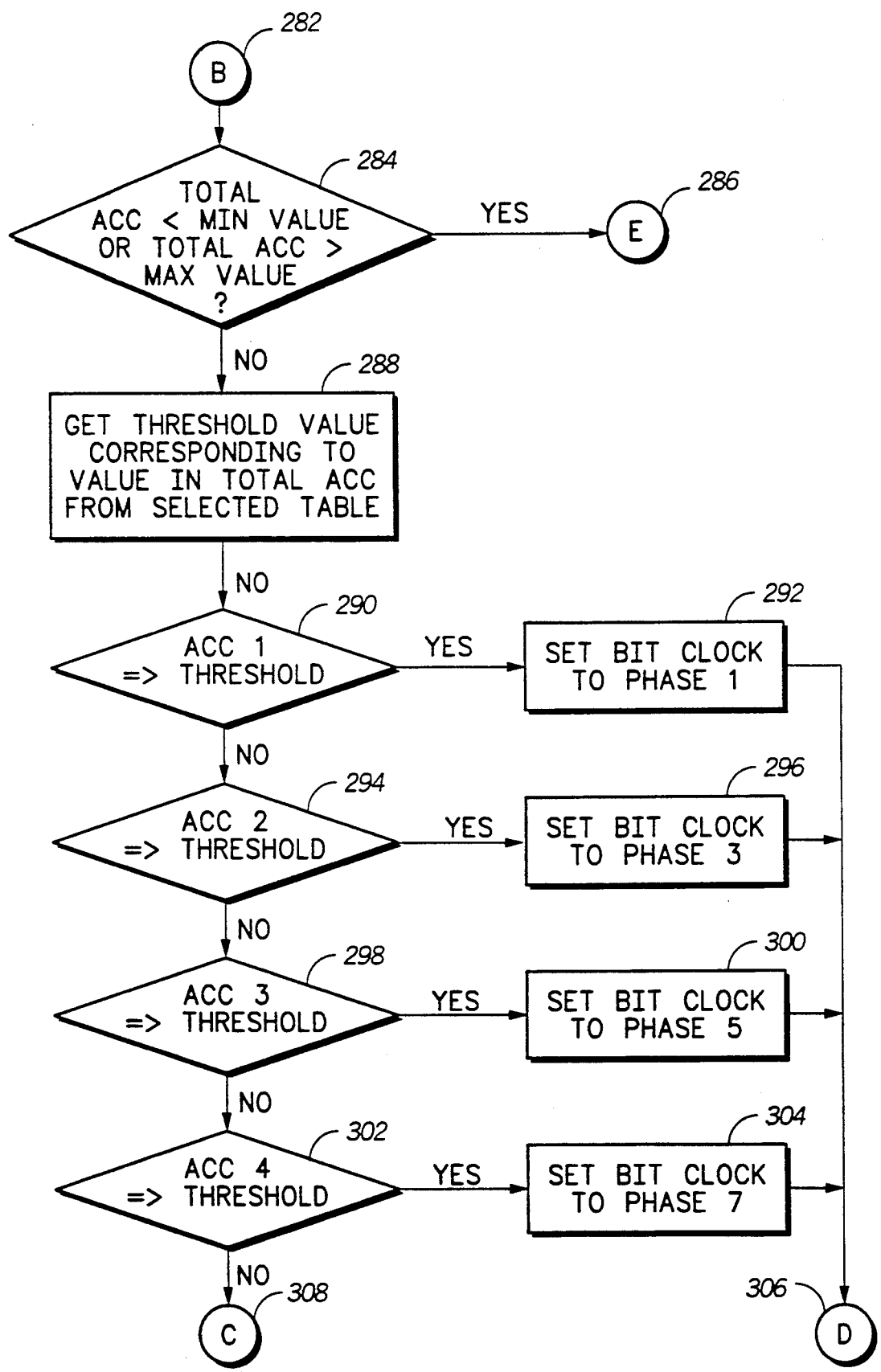
Figure 5D:
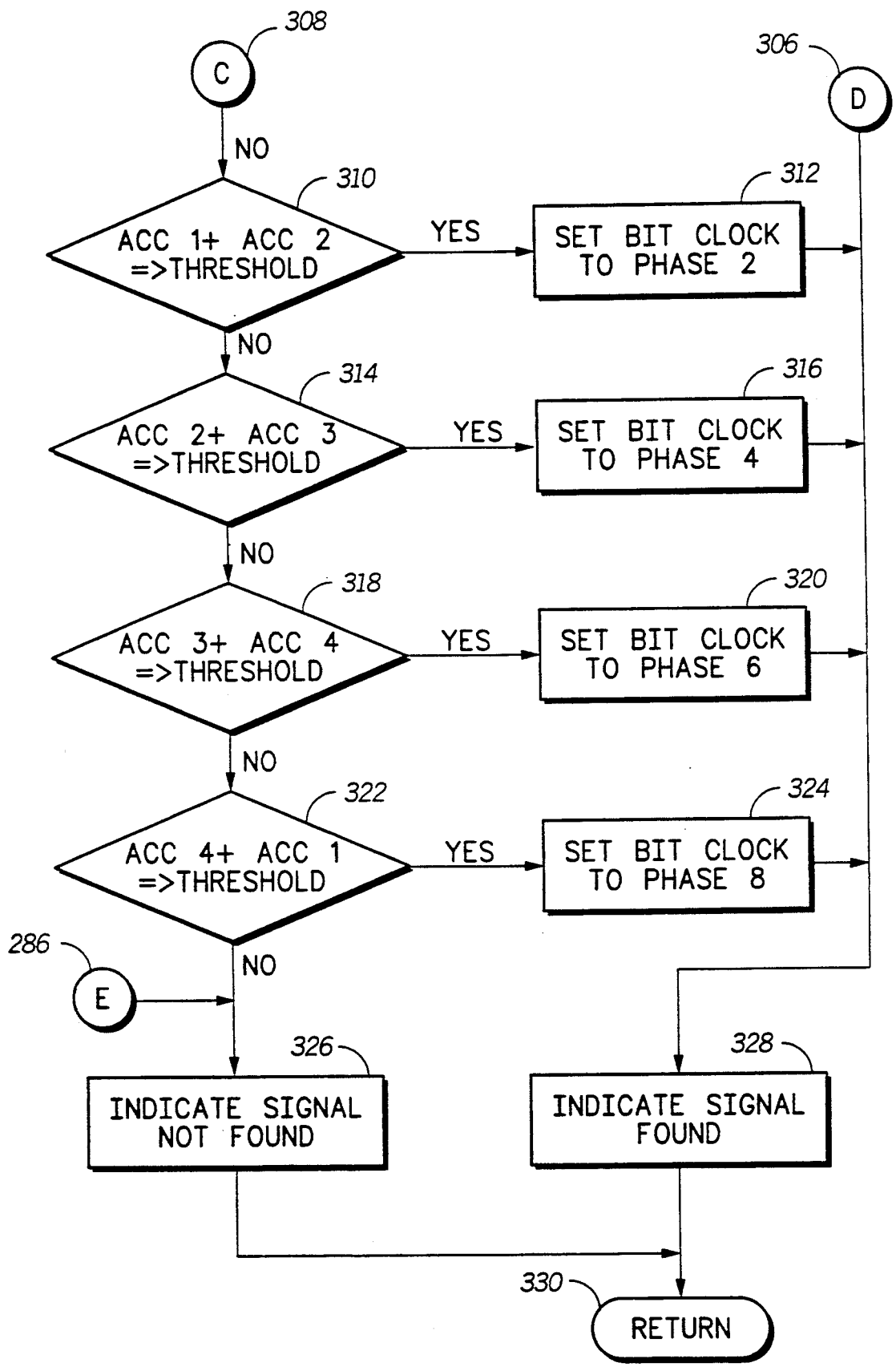
Figure 6:
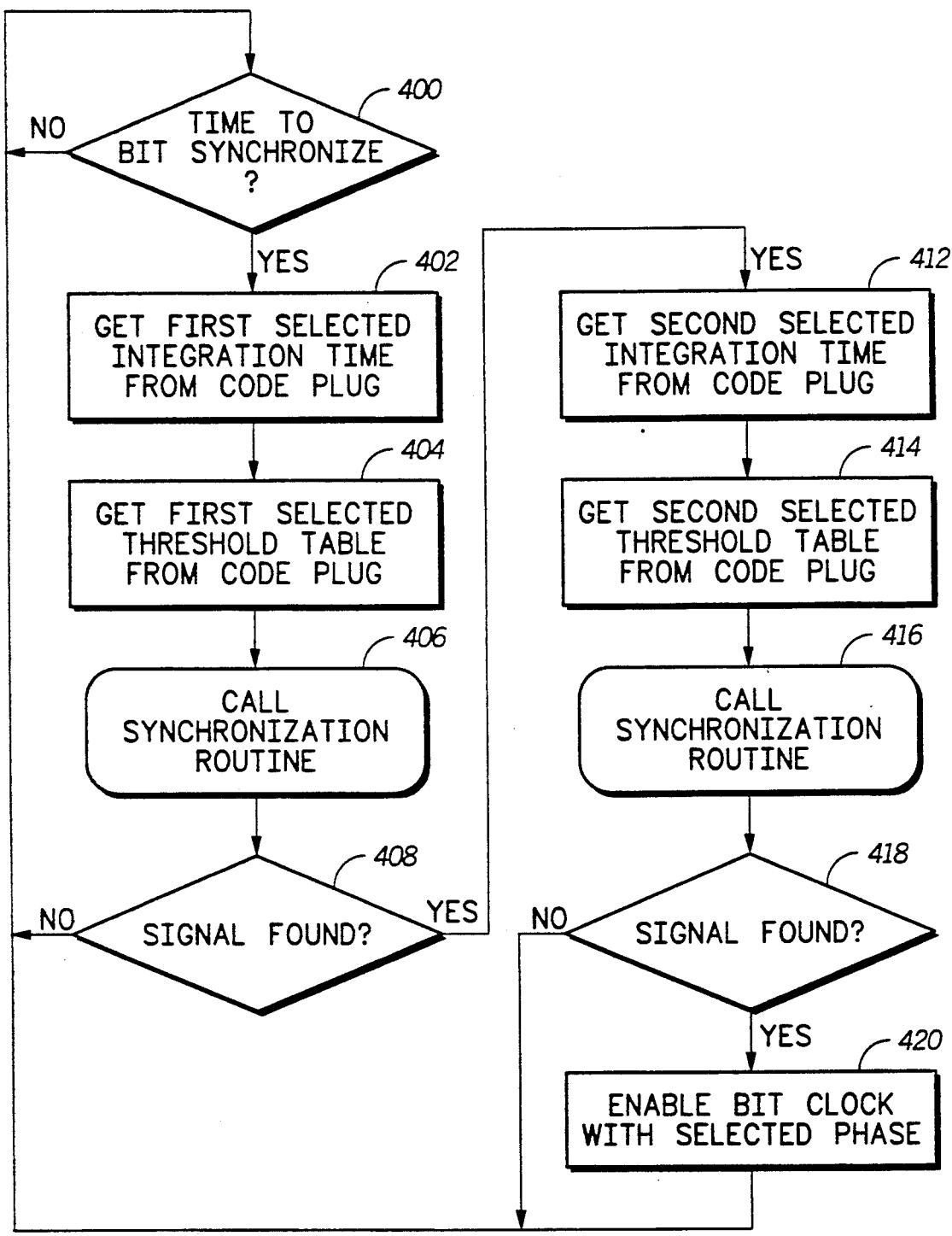
FIG. 6 shows a second flow chart of a routine which initializes and calls the synchronization routine of FIG. 5.

While FIG. 3 shows a hardware implementation of the invention, FIGS. 4, 5 and 6 show a software implementation of the invention. FIG. 4 shows the bit synchronization as a task operating in a multi-tasking program operating within the microcomputer within the paging receiver. Step 200 determines if it is time to execute the bit synchronization routine. If not, the step is shown to loop back to itself. When a controlling program determines it is time to bit synchronize, the program proceeds to step 202 where the selected integration is determined from the code plug contents. Then in step 204 the selected threshold table is determined from the code plug contents. In step 206, the synchronization routine is called. FIG. 5 details the operation of the synchronization routine. The synchronization routine indicates if a signal was found and determines a clock phase synchronized to the data within the signal. After returning from the synchronization routine, step 208 checks if a signal was found, if not the program returns to step 200. Additionally, the controlling program would cause the paging receiver to enter a power conservation mode. If a signal was found in step 208, the bit clock is enabled at the selected phase in step 210. The program then returns to step 200. Additionally, the controlling program would cause the decoder to search for the sync code using the bit clock in order to sample the signal.

FIGS. 5A, B, C, and D, describe the synchronization routine and represent steps performed during step 206 of FIG. 4. The synchronization routine is entered at step 220. Step 222 loads the integration time determined from step 202. Step 224 samples the data. Step 226 delays and takes a sample of data. The delay is equivalent to the time necessary to make the sample occur at a time one fourth of a bit time after the previous sample taken during the program. After taking the sample, the program proceeds to step 228 where the binary state of the sample is checked to be different from the binary state of the previous sample. If there is a difference, a transition has occurred and the program proceeds to step 230 to increment accumulator 1 and increment the total accumulator. If a transition did not occur, step 230 is not executed. Steps 236-240, and 246-250, and 256-260 are identical in operation to steps 226-236 except that accumulator 2, accumulator 3, and accumulator 4 respectively are incremented in place of accumulator 1 in step 230. Finally in step 262, the end of the integration time is checked for. If more samples are to be taken, the program returns to execute step 226. At the end of the integration time, the program proceeds through connecter "A", step 265, to analyze the accumulated information.

It can be appreciated to one familiar with the art that the operation of the steps of FIG. 5A require relatively few microcomputer cycles to execute. Note that no calculations are performed between data samples and that the only operation is to increment two accumulators if a transition occurred between samples. The lower amount of microcomputer cycles will allow a microcomputer operating in a real time mode to operate at a lower bus rate. Operating at a lower bus rate will reduce the power consumed by the microcomputer and thus improve the battery life of the paging receiver. It can also be appreciated that the steps of FIG. 5A perform the software equivalent of functions 102, 115, and 130 of FIG. 3.

FIGS. 5B, C and D, show steps used to analyze the values within the accumulators. FIG. 5B shows the normalization of the accumulators. The normalized integration time is 16 bits, if a different integration time is used, the values are normalized to a 16 bit integration time. This embodiment provides for 4 integrations times of 8, 16, 32, or 64 bits. The normalization is accomplished with the following steps. Through connector "A", step 265, step 270 is executed. In step 270, the integration time is checked to be 8 bits. If true, the program proceeds to step 272 in order to multiply the accumulators 1-4 and the total accumulator by 2. The program then proceeds to connector "B", step 282. If in step 270, the integration time was not 32 bits, the program proceeds to step 274 where the integration time is checked to be 32 bits. If true, the program proceeds to step 276 in order to divide the accumulators 1-4 and the total accumulator by 2. The program then proceeds to connector "B", step 282. If in step 274, the integration time was not 32 bits, the program proceeds to step 278 where the integration time is checked to be 64 bits. If true, the program proceeds to step 280 in order to divide the accumulators 1-4 and the total accumulator by 4. The program then proceeds to connector "B", step 282. If in step 278, the integration time was not 64 bits, the integration time was by default 16 bits and no normalization is required, and the program proceeds to connector "B", step 282.

It can be appreciated that doubling, halving or quartering the values of the accumulators in response to 8, 32, or 64 bit integration times, respectively has the effect of normalizing the integration times around the 16 bit integration time. It can be further appreciated that such operations are simple binary shifts in binary accumulators within a microcomputer and do not require extensive microcomputer cycles. Furthermore, rounding up or down as a result of a division is a relatively trivial process to those familiar with the art and improves the accuracy of the division process. As stated previously, increasing the integration time has the effect of improving the ability to distinguish between signal and noise. Although normalization around a sixteen bit integration time is shown, other times may be used for normalization. Additionally, in an alternate embodiment, normalization would not be required if values corresponding to the increased number of transitions were provided in the threshold tables.

FIG. 5C and D show the operation of analyzing the accumulators and setting the phase of the bit clock. The program executes step 284 through connector "B" step 282. In step 284 the value of the total accumulator is checked to be less than a minimum value or greater than a maximum value. In the preferred embodiment, the minimum value is 1 and the maximum value is 20. If true, the program proceeds to connector "E" step 286. This path is equivalent to the lack of signal condition because not enough or too many transitions occurred during the integration time. If the correct range of transitions occurred, the program proceeds to step 288 to get the threshold value corresponding to the value in the total accumulator. In one embodiment, the threshold value is selected from one of four tables, the table being designated by the calling routine.

After getting the threshold value, the accumulators are examined, and either a bit clock phase is selected or the absence of signal is determined. To reiterate, the bit clock has eight possible phases, 1 through 8, each separated by 45°, wherein a bit time has 360°. Furthermore, phase 1 corresponds to the timing of the sample of step 246. This provides the timing relationship between the data sampling portion and establishing the bit clock.

In step 290, accumulator 1 is checked to be greater than or equal to the threshold value. If true, the program proceeds to step 292 to set the bit clock to phase 1. If false, the program proceeds to step 294 where accumulator 2 is checked to be greater than or equal to the threshold value. If true, the program proceeds to step 296 to set the bit clock to phase 3. If false, the program proceeds to step 298 where accumulator 3 is checked to be greater than or equal to the threshold value. If true, the program proceeds to step 300 to set the bit clock to phase 5. If false, the program proceeds to step 302 where accumulator 4 is checked to be greater than or equal to the threshold value. If true, the program proceeds to step 304 to set the bit clock to phase 7. If false, the program proceeds to connector "C", step 308. From setting the phase of the bit clock in either steps 292, 296, 300, or 304, the program proceeds to connector "D" step 306.

FIG. 5C shows examining each individual accumulator and setting the phase clock equal to a predetermined phase if the accumulator is greater than or equal to the threshold. FIG. 5D shows examining pairs of accumulators to exceed the threshold value and set the phase of the bit clock in response thereof.

Step 310 is entered from connector "C", step 308. In step 310 the program checks for the sum of accumulator 1 and accumulator 2 to be greater than or equal to the threshold value. If true, the program proceeds to step 312 to set the bit clock to phase 2. If false, the program proceeds to step 314 where the program checks for the sum of accumulator 2 and accumulator 3 to be greater than or equal to the threshold value. If true, the program proceeds to step 316 to set the bit clock to phase 4. If false, the program proceeds to step 318 where the program checks for the sum of accumulator 3 and accumulator 4 to be greater than or equal to the threshold value. If true, the program proceeds to step 320 to set the bit clock to phase 6. If false, the program proceeds to step 322 where the program checks for the sum of accumulator 4 and accumulator 1 to be greater than or equal to the threshold value. If true, the program proceeds to step 324 to set the bit clock to phase 8. If false, the program proceeds to step 326 where an indication is made that the signal is not found. This is because the distribution of transitions which resemble the signal were not found in any accumulator or accumulator pair. The program then proceeds to step 330 to return to the calling routine. From either connector "D", step 306 or from setting the phase of the bit clock in step 312, 316, 320, or 324, the program proceeds to step 328 where the indication is made that signal was found. From step 328, the program proceeds to step 330 to return to the calling routine.

FIGS. 5B, 5C and 5D show analyzing the accumulators after the integration time and determining the absence of signal or the presence of signal and the corresponding phase setting of the bit clock. It can be appreciated that these flow charts effectively implement the functions 140, 150 and 160 of FIG. 3. It should be noted that the calculation of the figures are not necessarily time critical, so long at it is possible to set the phase of the bit clock relative to the phases used during the integration time. Thus the amount of microcomputer cycles necessary to perform analysis may be done outside of a real time environment. This further provides for operating the microcomputer at a lower bus rate, and thus conserving battery power.

It can further be appreciated that other embodiments may include a number of alterations. For example, incrementing the total accumulator during the integration time can be eliminated. After the integration time the total value can be determined by summing the accumulators 1 through 4. The phase setting of the bit clock is predetermined. In alternate embodiments, though, the number of possible phases of the bit clock can be increased and the bit clock's phase chosen by analyzing the values of accumulators 1 through 4. For example, a weighted average of the accumulators can be used to determine the average location of the transitions, and the bit clock can be set to be 180° out of phase with the average location. The invention shows four samples per bit during the integration time. The some principles can be applied to alternate embodiments which use more or less samples per bit. This would result in a corresponding number of accumulators, and the number of accumulators summed during the distribution analysis can be increased beyond 2 in alternate embodiments. It should be further appreciated that the steps of selecting the phase of the bit clock can be disregarded, or the bit clock means 160 can be eliminated, and the invention can be used as a signal detector.

In another embodiment, FIG. 6 shows using the synchronization routine of FIG. 5 first as a signal detector and, in response to detecting the signal, second as a bit synchronizer. Step 400 determines if it is time to execute the bit synchronization routine. If not, the step is shown to loop back to itself. When a controlling program determines it is time to bit synchronize, the program proceeds to step 402 where the first selected integration is determined from the code plug contents. Then in step 404 the first selected threshold table is determined from the code plug contents. In step 406, the synchronization routine of FIG. 5 is called. The synchronization routine indicates if a signal was found and then determines a clock phase synchronized to the data within the signal. After returning from the synchronization routine, step 408 checks if a signal was found, if not the program returns to step 400. In response to this, the controlling program would cause the paging receiver to enter a low power mode. If a signal was found in step 408, a second pass is executed. The program proceeds to step 412 where the second selected integration is determined from the code plug contents. Then in step 414 the second selected threshold table is determined from the code plug contents. In step 416, the synchronization routine of FIG. 5 is called. The synchronization routine indicates if a signal was found and determines a clock phase synchronized to the data within the signal. After returning from the synchronization routine, step 418 checks if a signal was found. If not the program returns to step 400. In response to this, the controlling program would cause the paging receiver to enter a low power mode. If a signal was found in step 418, the bit clock is enabled at the selected phase in step 420. The program then returns to step 400. In response to this, the controlling program would cause the paging receiver to enter a sync code search mode.

Thus FIG. 6 shows first detecting the presence of signal and then gathering more information in order to synchronize to the signal. In the first pass, a short integration time and a first threshold table could be used, and in the second pass, a longer integration time and a second threshold table could be used. Additionally, it is possible to inhibit resetting the accumulators between passes, thus the transitions accumulated during the first pass could be added to the transitions accumulated in the second pass. In one embodiment, the first pass integration time would be 16 bits and the second pass integration time would also be 16 bits, this provides for the detection of the absence of signal in sixteen bits, thereby allowing the paging receiver to perform battery saving within a short interval. In the presence of signal, the integration would continue and allow for a 32 bit integration time in order to more accurately set the phase of the bit clock and improve the sensitivity and falsing characteristics of the invention.

It should be further appreciated that in an alternate embodiment, the setting of synchronization parameters with the code plug can be eliminated. The synchronization parameters can be configured to be a predetermined part of the operation of the synchronizer thereby eliminating programming the characteristics of the synchronizer.

While the above principles of the invention have been described with a specific apparatus, it is to be clearly understood that this description is made by way of example only and not a limitation to the scope of the invention as set forth in the accompanying claims.

What is claimed is:

1. A digital signal detector receiving a signal having a plurality of digital symbols received at a predetermined baud rate, the signal detector comprising:

data clock means for generating a timing signal;

phase generating means, responsive to the timing signal, for generating a reference signal having a frequency integerly related to the baud rate, the reference signal comprising a plurality of independent phase signals generated relative to the received signal;

transition detecting means responsive to the timing signal for detecting transitions which may occur between symbols and for producing an edge signal in response thereof;

counting means, coupled to said transition detecting means and said phase generating means, and having a plurality of phase accumulators, each responsive to the edge signal and one of the phase signals which is selectively coupled thereto for accumulating an edge signal count when the edge signal coincides with the phase signal selectively coupled thereto, said counting means further including totalizing means for accumulating a total edge signal count of the number of edge signals detected with a fixed integration time interval;

controlling means for initializing said counting means and for enabling said counting means for the fixed integration time interval and for generating a completion signal at the end of the fixed integration time interval; and analyzing means coupled to said counting means and including memory means for storing at least one table of predetermined threshold values corresponding to each of a plurality of total edge signal counts, said analyzing means responsive to the completion signal for selecting from said memory means a threshold value corresponding to the total edge signal count accumulated, and for producing a detect signal in response to the threshold value selected being exceeded by at least one of the edge signal counts accumulated within one of the plurality of phase accumulators.

2. The signal detector of claim 1 wherein said phase generating means generates a reference signal having four phases, each of the four phases corresponding to one fourth of a digital symbol.

3. The signal detector of claim 2 wherein said counting means has four phase accumulators and wherein each phase accumulator corresponds to one of the four phases of the reference signal.

4. The signal detector of claim 1 wherein said transition detecting means, being responsive to the timing signal, for first sampling the state of the received signal in coincidence with a phase signal, and for subsequently sampling the received signal in coincidence with a subsequent phase signal, for detecting a transition in response to a difference between the first and subsequent samples.

5. The signal detector of claim 1 wherein the detect signal includes information corresponding to the phase signal which exceeds the selected threshold value, said data clock means being responsive to the detect signal for providing the timing signal at the baud rate for sampling each symbol, wherein the phase of the timing signal is established in response to the detect signal.

6. The signal detector of claim 5 wherein the timing signal phase is adjusted to be substantially 180 degrees out of phase with the corresponding phase signals producing the detect signal.

7. The signal detector of claim 1 wherein said analyzing means produces the detect signal in response to the threshold value being exceeded by a sum of edge signal counts accumulated within any predetermined number of phase accumulators which correspond to adjacent phase signals of the reference signal.

8. The signal detector of claim 7 wherein said counting means has four phase accumulators and wherein each phase accumulator corresponds to one of the four phases of the reference signal, and said analyzing means produces the detect signal in response to the threshold value being exceeded by the sum of edge signal counts accumulated within any two phase accumulators which correspond to two adjacent phases of the reference signal.

9. The signal detector of claim 7 wherein said data clock means is responsive to the detect signal for providing a timing signal at the baud rate for sampling each symbol, and wherein the timing signal is phase adjusted to be substantially 180 degrees out of phase with the corresponding adjacent phase signals producing the detect signal.

10. The signal detector of claim 7 wherein said data clock means is responsive to the detect signal for providing a timing signal at the baud rate for sampling each symbol, and wherein the timing signal is phase adjusted to be substantially 180 degrees out of phase with the function of the edge signal counts accumulated within said phase accumulators.

11. The signal detector of claim 1 wherein said controlling means includes a means for dividing the integration time by a constant, said means comprising:
    selecting means for selecting the constant; and
    dividing means for dividing the edge signal counts accumulated in said counting means by the constant in response to the completion signal.

12. The signal detector of claim 11 further comprising a code plug means storing information signals indicative of a particular constant, and wherein said selecting means selects the constant in response to the stored information signals.

13. The signal detector of claim 12 wherein the constant is selectable from the values of 0.5, 1.0, 2.0, or 4.0.

14. The signal detector of claim 1 wherein the integration time interval corresponds to sixteen symbol intervals.

15. The signal detector of claim 1 wherein said;
    memory means stores a plurality of threshold tables, each threshold table having a plurality threshold values, each threshold value corresponding to at least one total edge count signal accumulation; and
    selecting means for selecting one of the plurality of threshold tables,
    wherein said analyzing means selects the threshold value from the selected threshold table, wherein the selected threshold value corresponding to the total edge count signal accumulation.

16. The signal detector of claim 15 further comprising a code plug means storing information signals for selecting a particular threshold table, wherein said selecting means selects the threshold table in response to the stored information signals.

17. The signal detector of claim 1 further comprising:
    control means responsive to the detect signal for enabling said controlling means to enable said counting means for a second integration interval, wherein said controlling means generates an enable signal in response to the detect signal from the second integration interval, and said
    data clock means is responsive to the enable signal for providing a timing signal at the baud rate for sampling each symbol, wherein the phase of the timing signal is established in response to the detect signal from the second integration interval.

18. The signal detector of claim 17 wherein said memory means includes a plurality of threshold tables, each threshold table having a plurality of threshold values, and said signal detector further comprises
    selecting means for selecting one of the plurality of threshold tables, wherein
    said analyzing means selects the threshold value from the selected threshold table, the threshold value corresponding to the total edge count signal accumulated, and wherein
    said selecting means selects a second threshold table for the second integration interval.

19. The signal detector of claim 18 further comprises a code plug means for storing information signals for selecting a particular threshold table, wherein said selecting means selects the threshold table in response to the stored information signals.

20. A digital signal absence detector receiving a signal having a plurality of digital symbols received at a predetermined baud rate comprising:
    data clock means for generating a timing signal;
    phase generating means, responsive to the timing signal, for generating a reference signal having a frequency corresponding to the baud rate, the reference signal comprising a plurality of independent phase signals generated relative to the receive signal;
    transition detecting means responsive to the timing signal for detecting transitions which may occur between symbols;
    counting means responsive to said transition detecting means and said phase generating means, and having a plurality of phase accumulators, each responsive to the detected transitions and one of the phase signals which is selectively coupled thereto for accumulating a transition count when the detected transition coincides with the phase signal selectively coupled thereto;
    said counting means further including totalizing means for accumulating a total count of the number of transitions detected within a fixed time interval;
    controlling means for resetting said counting means and for operating said counting means for the fixed time interval and for generating a completion signal at the end of the fixed time interval; and
    analyzing means, including memory means for storing a table of predetermined threshold values corresponding to the total transitions detected, said analyzing means being coupled to said counting means and responsive to the completion signal, for selecting from said memory means a threshold value corresponding to the total transitions detected, and for producing an absence signal in response to the threshold value selected not being exceeded by a sum of values within any predetermined number of said phase accumulators which correspond to contiguous phases of the reference signal.

21. The absence detector of claim 20 further comprising a receiving means which is periodically activated and consumes power while receiving the signal, said receiving means being coupled to said analyzing means, operates in a reduced power mode in response to the absence signal, thereby entering a lower power state.

22. A method of detecting a signal having a plurality of digital symbols received at a predetermined baud rate, the method comprising the steps of:
    generating a reference signal having a frequency corresponding to the baud rate, the reference signal comprising a plurality of independent phase signals having substantially unvarying phases generated relative to the received signal;
    detecting transitions which may occur between the digital symbols to derive transition detections;
    accumulating counts of said transition detections in a plurality of phase accumulators, wherein each phase accumulator accumulates a count in response to the transition detection being detected in coincidence with the phase signal corresponding to a particular phase accumulator;
    performing said steps of generating, detecting and accumulating for a fixed time interval;
    accumulating a total number of transition detections occurring during the fixed time interval;
    selecting a threshold value from a table of values stored in a memory in response to the total number of transition detections at the end of the fixed time interval; and producing a detect signal in response to the threshold value selected being exceeded by a value within a phase accumulator.

23. The method of claim 22 further comprising the step of producing the detect signal in response to the selected threshold value being exceeded by a sum of counts accumulated within a predetermined number of phase accumulators.

* * * * *